(12) United States Patent
Jo et al.

(10) Patent No.: US 7,438,349 B2
(45) Date of Patent: Oct. 21, 2008

(54) OPERATOR CAB FOR HEAVY CONSTRUCTION EQUIPMENT

(75) Inventors: Chun Ho Jo, Changwon (KR); Jung Gun Gwak, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 143 days.

(21) Appl. No.: 11/634,211

(22) Filed: Dec. 5, 2006

(65) Prior Publication Data
US 2007/0210619 A1   Sep. 13, 2007

(30) Foreign Application Priority Data
Mar. 13, 2006   (KR) ..................... 10-2006-0023076

(51) Int. Cl.
*B60J 7/00*   (2006.01)
(52) U.S. Cl. ..................... 296/190.11; 296/155; 49/221
(58) Field of Classification Search ............ 296/190.11, 296/190.01, 155, 146.4, 146.9, 202; 49/221, 49/360
See application file for complete search history.

(56) References Cited

U.S. PATENT DOCUMENTS 5,577,795 A * 11/1996 Shinsen ................. 296/190.11

* cited by examiner

*Primary Examiner*—Joseph D Pape
(74) *Attorney, Agent, or Firm*—Ladas and Parry LLP

(57) ABSTRACT

An operator cab for heavy construction equipment is disclosed to prevent a sliding door from rocking or rattling due to a shock or vibration applied to the cab in a state that the sliding door slidably mounted on the cab is opened or closed. The operator cab includes a sidewall member with a doorway, upper, central, and lower rails provided on upper, central, and lower portions of the sidewall member, respectively, a sliding door slid by upper, central, and lower rollers engaged with the upper, central, and lower rails, respectively, to open or close the doorway, upper and lower roller holders installed on ends of the upper and lower rails, respectively, in a shape corresponding to the upper and lower rollers, and having an engaging groove receiving and supporting the upper and lower rollers when the sliding door is fully opened or closed, a locking device having a pair of male and female locking strikers which are engaged to each other at one side of the sliding door when the sliding door is fully opened, and a locking holder formed on an external periphery of a loader corresponding to the male locking striker.

11 Claims, 10 Drawing Sheets

OPERATOR CAB FOR HEAVY CONSTRUCTION EQUIPMENT

CROSS-REFERENCE TO RELATED APPLICATION

This application is based on and claims priority from Korean Patent Application Nos. 10-2006-23076 and 10-2006-29019, filed on Mar. 13, 2006 and Mar. 30, 2006, respectively in the Korean Intellectual Property Office, the disclosure of which is incorporated herein in its entirety by reference.

BACKGROUND OF THE INVENTION

1. Field of the Invention

The present invention relates to an operator cab for heavy construction equipment capable of preventing a sliding door from rocking or rattling due to a shock or vibration applied to the cab in a state that the sliding door slidably mounted on the cab is opened or closed, as well as improving the durability and shock absorbing performance of a locking device and a locking holder.

More particularly, the present invention relates to an operator cab for heavy construction equipment, in which a roller received in an engaging groove is supported by the roller holder installed on both ends of a guide rail supporting the roller of a sliding door when the door is fully opened or closed, thereby preventing a sliding door from rocking or rattling due to the shock or vibration applied to the operator cab, and in which a housing of a female locking striker is inserted into a door locking device to absorb the shock and noise generated in a locking process.

2. Description of the Prior Art

Generally, a common hydraulic excavator has been used for a civil engineering work or construction work in a vast area and includes an operator cab at an upper structure supported by a lower traveling structure and working apparatus such as a boom, a bucket, etc.

In narrow and limited working environments such as a downtown area, however, an engine room mounted on the rear portion of the upper structure, as well as the working apparatus (e.g., boom) mounted on a front portion thereof, collides against exterior objects while the upper structure swings in operation. In addition, the operator cab collides against the exterior in its opening/closing operation.

In order to solve the above problems, the hydraulic excavator with a small swing type of heavy construction equipment, as conventionally known for a small swing or short swing excavator, has been developed to reduce the radius of swing of the operator cab or the upper swing structure.

The door of the conventional excavator is generally installed on the external wall of the cab in such a way that it is slidably opened or closed along a predetermined small radius on the external wall and the external surface of the operator cab and the door thereof are outwardly covered or bent in an arc shape to sufficiently secure an internal space of the operator cab in view of the structure of the cab.

More specifically, as shown in FIGS. 1 to 3c, conventional operator cab of the excavator includes a door 3 slidably installed on an external wall 2a.

The cap includes a plurality of rails 4, 5, and 6 provided on the external wall 2a, a plurality of rollers 7, 8, and 9 mounted on the door 3, each of the rollers 7, 8, and 9 always being in engagement with the respective rails 4, 5, and 6 to support the door 3 when the door is slid between a closed position, in which a doorway is closed, and a fully opened position, in which the doorway is open, and pairs of strikers, each of pairs of strikers including female strikers 10 and 12 and male strikers 11 and 13, one of the pair of strikers being mounted on the door 3 and the other being mounted on the external wall such that at least one pair of strikers are engaged with each other when the door is in its closed position and at least one pair of strikers are engaged with each other when the door is in its fully opened position.

At least one of the pairs of strikers is mounted in such a way that the strikers are engaged with each other at a front edge portion of the door when the door is fully opened, and at least the other of the pairs of strikers is mounted in such a way that the strikers are engaged with each other at a rear edge portion of the door when the door is fully opened (U.S. Pat. No. 5,577,795).

In particular, as shown in FIG. 3c, the central roller 9 of the door 3 consists of a rolling roller 9a which is rotated in an X-axis direction to support the load of the sliding door 3 when the door 3 is slid, and a guide roller 9b which is rotated in a Y-axis direction to prevent the sliding door 3 from being released from the central rail 6 when the sliding door 3 is slid.

In case the excavator is driven when the sliding door 3 is fully opened or closed, the sliding door 3 swings left and right or rattles up and down due to the shock or vibration applied to the cab. As a result, an operator does not concentrate upon his work to lower the operation efficiency and to cause a safety accident.

Taking the above problems into consideration, a plurality of male and female strikers 10, 11, 12, 13, 14, and 15 are provided on the sliding door 3 and the cab 2 and are engaged with each other, as shown in FIGS. 1 and 2, so as to prevent the sliding door 3 from rocking or rattling due to the vibration applied to the cab 2, when the excavator works in a state that the sliding door 3 is fully opened (see FIG. 3b) or is fully closed (see FIG. 3a).

As shown in FIG. 1, locking strikers 16 and 17 are respectively installed on the sliding door 3 and the cab 2, so as to lock the sliding door 3 in the opened position or closed position. In this instance, the locking striker 16 is installed at a position adjacent to a doorway 2b, while the locking striker 17 is installed at a position far away from the doorway 17.

According to the structure of the conventional operator cab for heavy construction equipment, since the plurality of male and female strikers 10, 11, 12, 13, 14, and 15 (see FIGS. 1 and 2) and the locking strikers 16 and 17 (see FIG. 1) which can maintain the sliding door 3 against the cab 2 in a fully opened state or in a fully closed state are outwardly exposed from the sliding door 3, the cab suffers from the sever noise due to the shock. In addition, because of the increased number of components, the cost is raised, and the assembling time and process are increased, thereby lowering the production efficiency and thus the price competitiveness thereof.

Also, the door locking device of the conventional cab for heavy construction equipment includes a pair of male and female locking strikers 18a and 18b. The male locking striker 18a is fixed to a sidewall member 2c in such a way that the head 22a of a loader 22 protrudes outwardly in a longitudinal direction of a lock holder 20. The female locking striker 18b has a fixing member 21 of which a locking stepped portion is radially expanded or contracted at the opening of the housing 19 when the loader 22 is inserted into and engaged with the housing 19.

Specifically, in case the sliding door 3 is locked, the head 22a of the loader 22 passes through the housing 19 and the fixing member 21, and collides against the bottom of the fixing member. In this instance, the locking stepped portion of the fixing member 21 is contracted to a size less than the diameter of the head at a rear position of the head 22a, so that the head 22a of the loader 22 is fixed and supported by the housing 19 and the fixing member 21.

By contrast, the locking stepped portion of the fixing member 21 is expanded to a size larger than the diameter of the head 22a, so that the head 22a of the loader 22 escapes from the housing 19 and the fixing member 21.

In this instance, the door locking holder 20 directly collides against the front end 19a of the housing 19 to form a surface contact, when the head 22a of the loader 22 comes in contact with the bottom of the fixing member 21.

As a result, the conventional door locking device has a drawback in that one side of the front end of the door locking holder is worn, so that the door locking holder suffers from the severe uneven wear, thereby reducing its durability.

Also, in case of locking the sliding door, the noise and the vibration are largely generated due to the shock generated when the head of the loader collides against the bottom of the fixing member. In particular, when the front end of the locking holder is unevenly worn, a clearance or gap happens at the attached portion between the housing and the locking holder, thereby destabilizing the locking state of the door and lowering the ability of absorbing the noise and vibration.

SUMMARY OF THE INVENTION

Accordingly, the present invention has been made to solve the above-mentioned problems occurring in the prior art while advantages achieved by the prior art are maintained intact.

One object of the present invention is to provide an operator cab for heavy construction equipment capable of suppressing the rocking or rattling of a sliding door due to vibration applied to the operator cab in a state that the sliding door of the operator cab is opened or closed, thereby preventing the door from rocking or rattling. As a result, the working time and process is reduced to lower the cost.

Another object of the present invention is to provide an operator cab for heavy construction equipment, in which a locking holder is constructed in such a way that it directly accommodates a portion of a housing of a female locking striker when a locking striker collides against the loader. Therefore, the shock and noise applied to the door and the operator cab are effectively absorbed and reduced.

In order to accomplish these objects, there is provided an operator cab for heavy construction equipment, according an embodiment of the present invention, which includes a sidewall member with a doorway; upper, central, and lower rails provided on upper, central, and lower portions of the sidewall member, respectively; a sliding door slid by upper, central, and lower rollers engaged with the upper, central, and lower rails, respectively, to open or close the doorway; and upper and lower roller holders installed on ends of the upper and lower rails, respectively, in a shape corresponding to the upper and lower rollers, and having an engaging groove receiving and supporting the upper and lower rollers when the sliding door is fully opened or closed.

According to another aspect of the present invention, there is provided an operator cab for heavy construction equipment, which includes a sidewall member with a doorway; upper, central, and lower rails provided on upper, central, and lower portions of the sidewall member, respectively; a sliding door slid by upper, central, and lower rollers engaged with the upper, central, and lower rails, respectively, to open or close the doorway; and upper, central, and lower roller holders installed on ends of the upper, central, and lower rails, respectively, in a shape corresponding to the upper, central, and lower rollers, and having an engaging groove receiving and supporting the upper, central, and lower rollers when the sliding door is fully opened or closed.

At least one of the upper, central, and lower roller holders may be an elastic member.

In this instance, the elastic member may be a rubber material.

In addition, each of the central and lower roller holders may be divided into a first roller holder receiving a rolling roller and a second roller holder receiving a guide roller.

The operator cab may further comprise upper, central, and lower bracket holders installed on the ends of the upper, central, and lower rails, respectively, and having a compressing groove receiving and supporting the bracket which rotatably supports the upper, central, and lower rollers when the sliding door is fully opened or closed.

According to another aspect of the present invention, there is provided an operator cab for heavy construction equipment, which includes a sidewall member with a doorway; upper, central, and lower rails provided on upper, central, and lower portions of the sidewall member, respectively; a sliding door slid by upper, central, and lower rollers engaged with the upper, central, and lower rails, respectively, to open or close the doorway; upper and lower roller holders installed on ends of the upper and lower rails, respectively, in a shape corresponding to the upper and lower rollers, and having an engaging groove receiving and supporting the upper and lower rollers when the sliding door is fully opened or closed; a locking device having a pair of male and female locking strikers which are engaged to each other at one side of the sliding door when the sliding door is fully opened; and a locking holder formed on an external periphery of a loader corresponding to the male locking striker.

The locking device may include at least one pair of locking strikers installed on the upper or central and the lower portions of the door, respectively, when the sliding door is fully opened, in which one of the strikers is installed on the sliding door, and the other is installed on the sidewall member, thereby selectively locking or unlocking the sliding door.

The locking device may include a male locking striker having a loader protruding from an outside of the sidewall member and a head of a diameter larger than that of a body; a female locking striker engaged with the male locking striker and having a housing installed on one side of the door and a fixing portion supporting a rear end of the head in the inside of the housing; and a locking holder installed on an outside of the loader of the male locking striker and having a recessed portion receiving a portion of the periphery surface of the housing when the door is locked.

At least one of the pair of the locking strikers may be engaged with each other at the upper or lower and central portions of the door far away from the doorway of the cab when the door is fully opened.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

The operator cab for heavy construction equipment according to the present invention will now be described in detail with reference to preferred embodiment.

Figure 1:
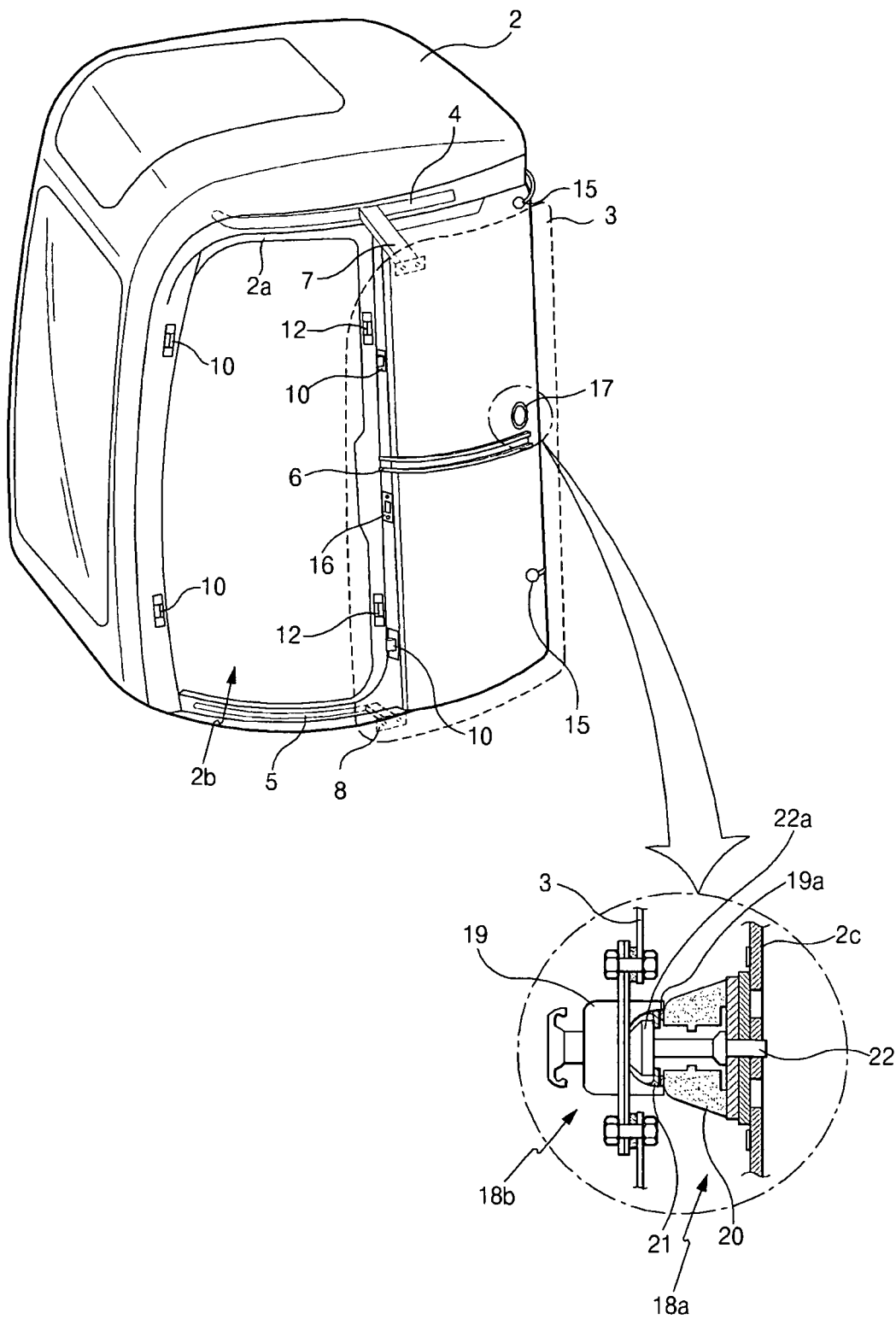
FIG. 1 is a perspective view of a conventional cab for heavy construction equipment.
Figure 2:
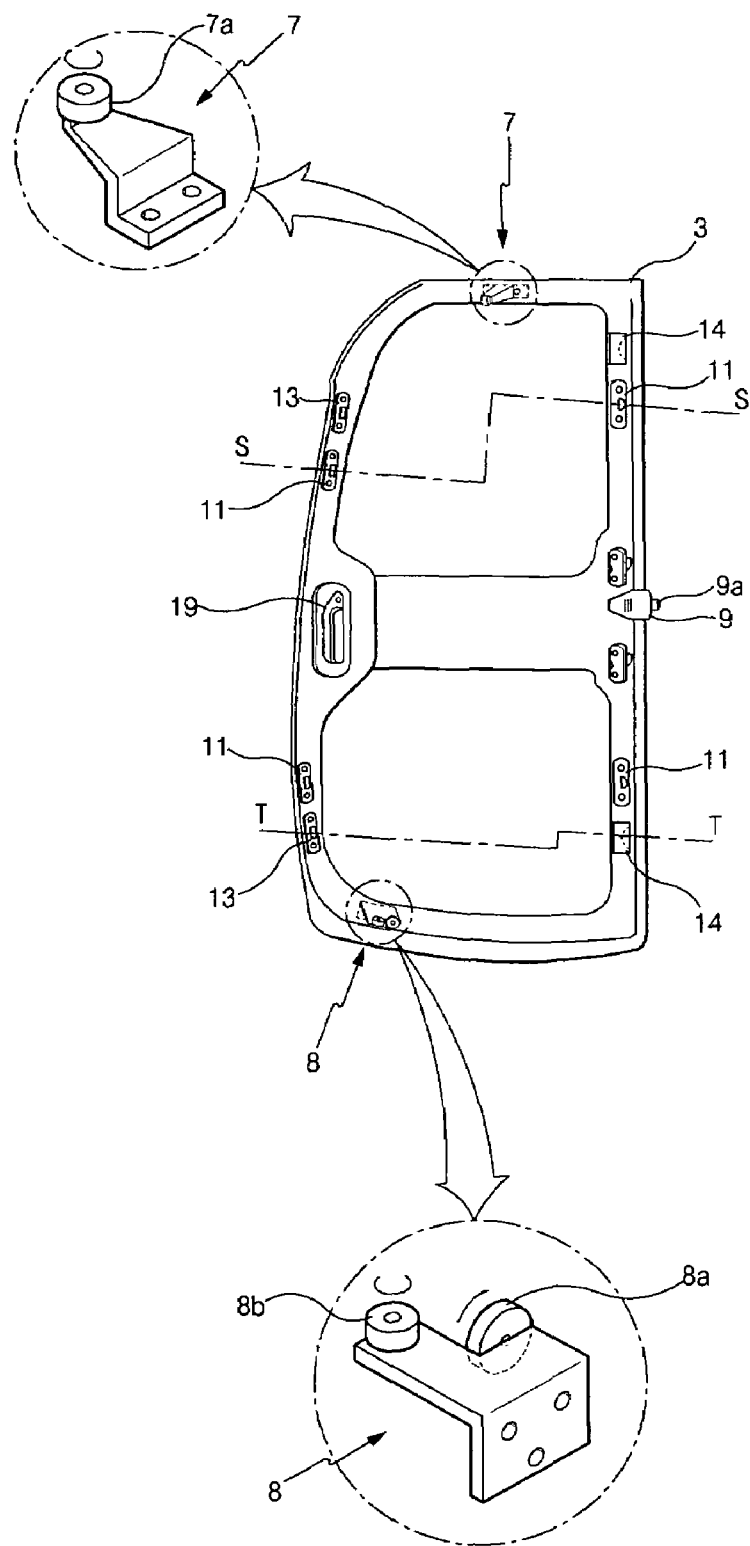
FIG. 2 is a side view of the sliding door in FIG. 1.
Figure 3A:
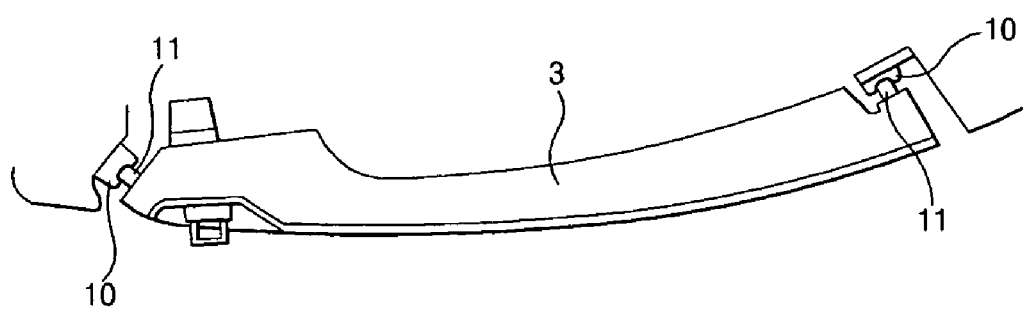
FIG. 3a is a cross-sectional view taken along line S-S in FIG. 2 to illustrate a closed state of the sliding door.
Figure 3B:
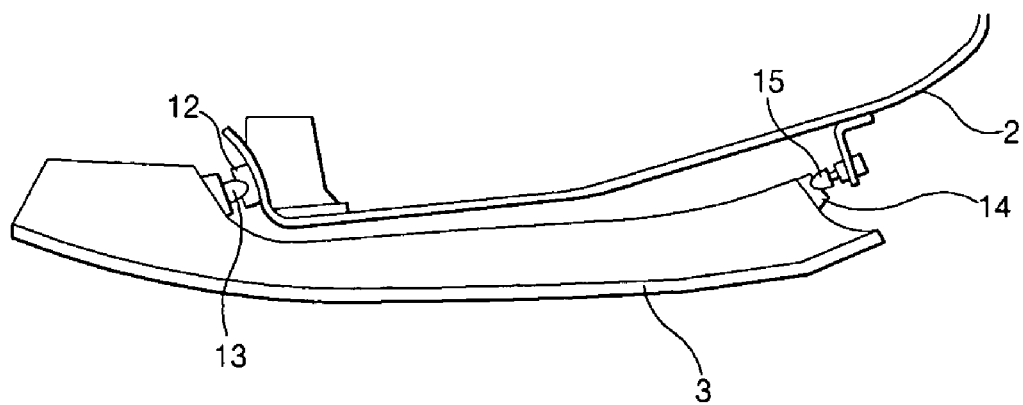
FIG. 3b is a cross-sectional view taken along line T-T in FIG. 2 to illustrate an opened state of the sliding door.
Figure 3C:
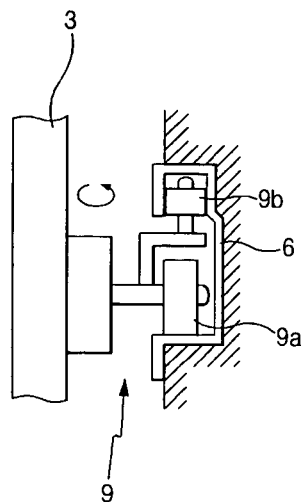
FIG. 3c is a cross-sectional view of the central rail and central roller in FIG. 1.
Figure 4:
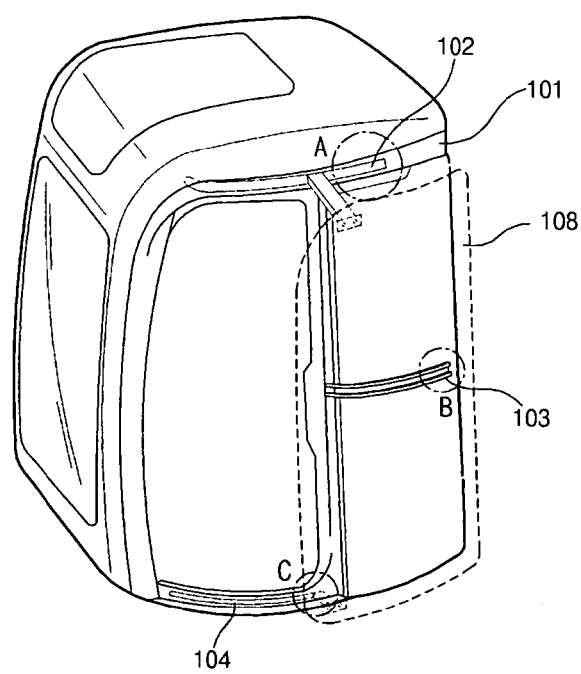
FIG. 4 is a perspective view illustrating a cab for heavy construction equipment according to a present invention.
Figure 5A:
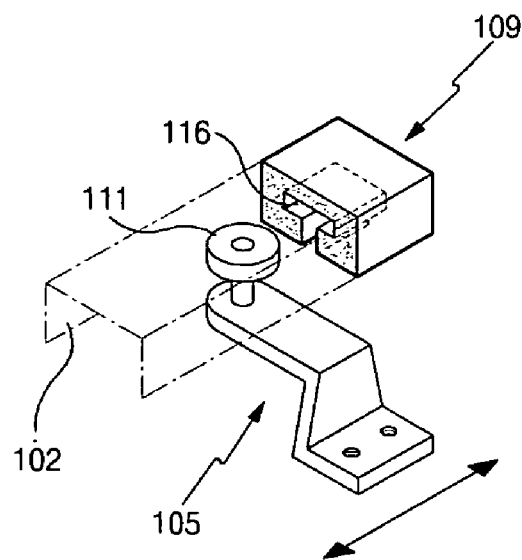
FIG. 5a is an enlarged view of the roller holder indicated by a circle portion A in FIG. 4.
Figure 5B:
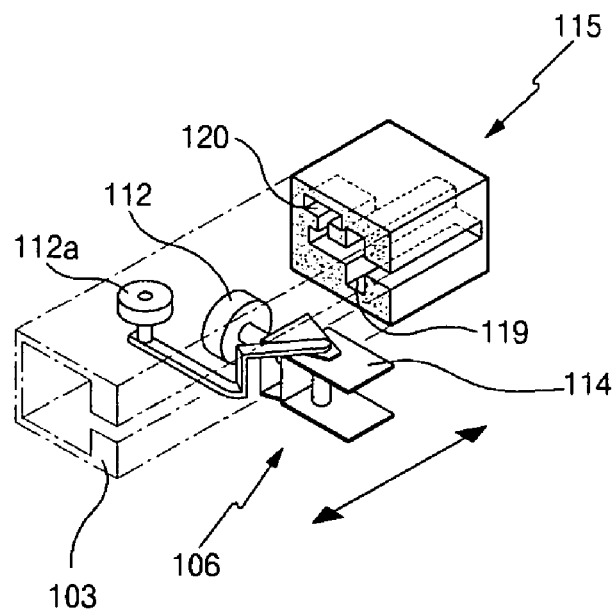
FIG. 5b is an enlarged view of the roller holder indicated by a circle portion B in FIG. 4.
Figure 5C:
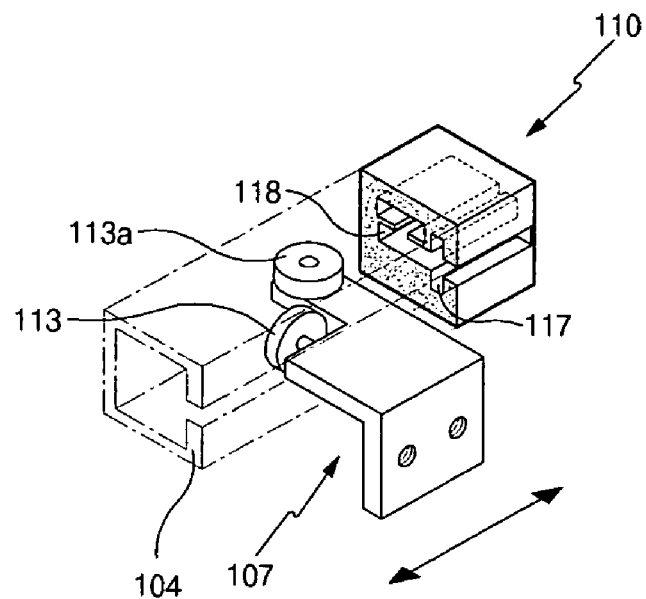
FIG. 5c is an enlarged view of the roller holder indicated by a circle portion C in FIG. 4.

Referring to FIGS. 4 to 6, the operator cab for the heavy construction equipment according to the present invention includes a sidewall member 101 with a doorway 100 through which an operator goes in and out, upper, central, and lower rails 102, 103, and 104 provided on upper, central, and lower portions of the sidewall member 101, respectively, a sliding door 108 slid by an upper roller 105 having a guide roller 111 engaged with the upper rail 104 and central and lower rollers 106 and 107 having rolling rollers 112 and 113 engaged with the central and lower rails 103 and 104 to open and close the doorway 100, an upper rubber roller holder 109 installed on an end of the upper rail 102 in a shape corresponding to the upper roller 105 and having an engaging groove 116 receiving and supporting the guide roller 111 of the upper roller 105 when the sliding door 108 is fully opened or closed, a lower rubber roller holder 110 installed on an end of the lower rail 104 in a shape corresponding to the lower roller 107 and having engaging grooves 117 and 118 receiving and supporting the rolling roller 113 and a guide roller 113a of the lower roller 107 when the sliding door 108 is fully opened or closed, and a central rubber roller holder 115 installed on an end of the central rail 103 in a shape corresponding to the central roller 106 and having engaging grooves 119 and 120 receiving and supporting the rolling roller 112 and a guide roller 112a of the central roller 106 when the sliding door 108 is fully opened or closed.

The central roller 106 includes the rolling roller 112 rotated in an X-axis direction to support the load of the sliding door 108 when the sliding door 108 is opened or closed, a guide roller 112a rotated in an Y-axis rotation to prevent the sliding door 108 from being released from the central rail 103 when the sliding door 108 is opened or closed, and a bracket 114 rotatably supporting the central roller 106 against the sliding door 108 to smoothly move the sliding door 108.

The lower roller 107 further includes a guide roller 113a preventing the sliding door 108 from being released from the lower rail 104 when the sliding door 108 is opened or closed.

In addition, the operator cab for heavy construction equipment according to the present invention absorbs the shock or vibration of the door by using the locking holder in the process of locking the door, as shown in FIGS. 7a to 7c.

The operator cab for heavy construction equipment according to the present invention includes a sidewall member 101 with a doorway 100, upper, central, and lower rails 102, 103, and 104 provided on upper, central, and lower portions of the sidewall member 101, respectively, a sliding door 108 slid by upper, central, and lower rollers 105, 106, and 107 having rolling rollers 111, 112, and 113 engaged with the upper, central, and the lower rails 102, 103, and 104, respectively, to open and close the doorway 100, an upper rubber roller holder 109 installed on an end of the upper rail 102 in a shape corresponding to the upper roller 105 and having an engaging groove 116 receiving and supporting the rolling roller 111 of the upper roller 105 when the sliding door 108 is fully opened or closed, a lower rubber roller holder 110 installed on an end of the lower rail 104 in a shape corresponding to the lower roller 107 and having engaging grooves 117 and 118 receiving and supporting the rolling roller 113 and a guide roller 113a of the lower roller 107 when the sliding door 108 is fully opened or closed, a central rubber roller holder 115 installed on an end of the central rail 103 in a shape corresponding to the central roller 106 and having engaging grooves 119 and 120 receiving and supporting the rolling roller 112 and guide roller 112a of the central roller 106 when the sliding door 108 is fully opened or closed, and a locking device having a pair of locking strikers 121 and 122 which are engaged to each other at one side of the door when the door 108 is fully opened, and having a locking holder 130 with a recessed portion 130a formed on an external periphery of the male locking striker 121 or loader 132.

The locking device includes at least one pair of locking strikers 121 and 122 installed on the upper or central and the lower portions of the door 108, respectively, when the sliding door 108 is fully opened. One of the strikers 121 and 122 is installed on the door 108, and the other is installed on the sidewall member 101, thereby selectively locking or unlocking the sliding door 108.

In a preferred embodiment of the present invention, the locking device includes a male locking striker 121 having a loader 132 protruding from an outside of the sidewall member 101 and a head 132a of a diameter larger than that of a body 132b, a female locking striker 122 engaged with the male locking striker 121 and having a housing 138 installed on one side of the door 108 and a fixing portion 139 supporting a rear end of the head 132a in the inside of the housing 138, and a locking holder 130 installed on an outside of the loader 132 of the male locking striker 121 and having a recessed portion 130a receiving a front end 138a of the housing 138 when the door is locked.

The head 132a of the loader 132 is positioned in the recessed portion 130a of the locking holder 130, and a part of the front end 138a of the housing 138 is inserted into the recessed portion 130a when the door is locked.

The locking device of the present invention includes a plurality of locking strikers 121 and 122. At least one pair of the locking strikers 121 and 122 are respectively installed on the upper or central portion and the lower portion of the door 108 when the sliding door 108 is fully opened. One of the strikers 121 and 122 is installed on the door 108, and the other is installed on the sidewall member 101, thereby selectively locking or unlocking the sliding door 108.

In this instance, each of the locking holder 130 has a recessed portion 130a inwardly bent. The locking holders 130 are installed on the outside of the loader corresponding to the plurality of male locking strikers 121, and are engaged with the outer surface of the housing 138.

Alternatively, the pair of the locking strikers 121 and 122 may be engaged with each other at the upper or lower and central portions of the door 108 far away from the doorway 100 of the cab when the door 108 is fully opened.

A knob 125 is installed on the bottom 139b of the fixing portion 139 opposite to the front end 138a of the housing 138 of the female locking striker 122.

A push rod 126 is interposed between the knob 125 and the bottom 139b to push the head 132a of the loader 132 outwardly. The fixing portion 139 may be composed of a plurality of resilient segmented members, for example, a bent leaf spring separated at 120 degrees.

In the embodiment of the present invention, the locking holder 130 is made of a rubber material, so that in the process of locking the door, the locking holder 130 comes in contact with the entire surface of the recessed portion 130a to absorb the shock and vibration of the door when the front end 138a of the housing 138 is seated on the recessed portion 130a.

With the above arrangement of the present invention, the male locking striker 121 and the locking holder 130 are fixed to one side of the sidewall member 101 of the door 108 through brackets 133 and 134. The female locking striker 122 is fixed to one side of the door 108 by engaging a fastening member 128 to the outer periphery of the housing 138 at a position corresponding to the male locking striker 121.

In a preferred embodiment of the present invention, the locking device of the door includes pairs of the male and female locking strikers 121 and 122 which are engaged with each other to lock or unlock the door 108. Pairs of the locking strikers 121 and 122 are respectively installed on the upper or central and lower portions of the door 108 in such a way that the strikers are engaged to each other when the door 108 is fully opened. In this instance, one of the strikers 121 and 122 is installed on the door 108, and the other is installed on the sidewall member 101. The locking holder 130 is installed on the outside of each male locking striker 121 or the outside of the loader 132.

The application of the operator cab for heavy construction equipment will now be described with reference to the drawings.

The heavy construction equipment such as an excavator mainly works in poor surroundings, with a sliding door being opened, so as to let some fresh air in the operator cab. In this instance, the present invention can prevent the sliding door from rocking or rattling due to the vibration applied to the cab, when the excavator works in a state that the sliding door is opened.

Referring to FIGS. 4 to 6, in case the sliding door 108 is slid toward the rear of the cab by an operator to open the sliding door 108, the upper roller 105, central roller 106, and lower roller 107 provided on the upper, central, and lower portions of the sliding door 108 are slid along the upper rail 102, central rail 103, and lower rail 104 provided on the sidewall member 101, thereby opening the sliding door 108 (shown by the dotted line in FIG. 4).

In this instance, since the opened sliding door 108 is positioned in a swing radius of the operator cab, the sliding door is not interfered with building or trees adjacent to a working site when the excavator swings on a narrow alley of a downtown area, with the sliding door 108 being opened during the working.

As shown in FIG. 6, when the sliding door 108 is slid to a fully opened position, the upper roller 105, the central roller 106, and the lower roller 107 are received in the engaging grooves 116, 119, 120, 117, and 118 of the upper, central, and lower roller holders 109, 115, and 110 installed on the ends of the upper rail 102, the central rail 103, and the lower rail 104, respectively.

Figure 6A:
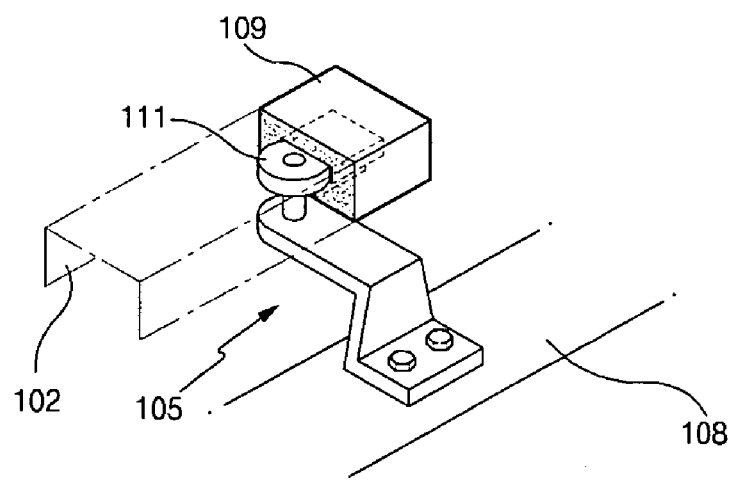
FIG. 6a is a view illustrating an upper roller holder mounted on a cab for heavy construction equipment according to the present invention.
Figure 6B:
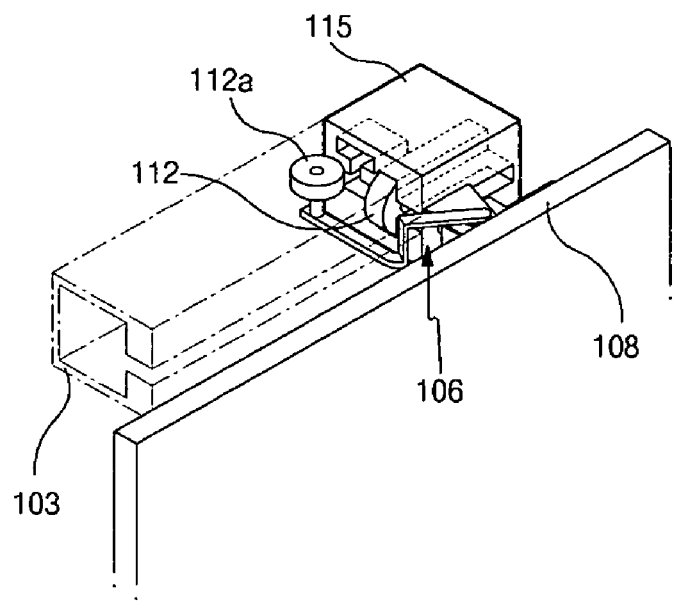
FIG. 6b is a view illustrating a central roller holder mounted on a cab for heavy construction equipment according to the present invention.
Figure 6C:
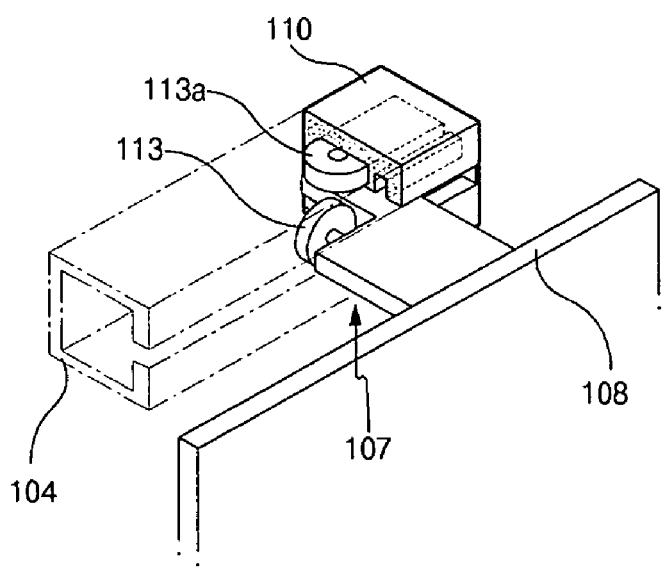
FIG. 6c is a view illustrating a lower roller holder mounted on a cab for heavy construction equipment according to the present invention.

Specifically, the guide roller 111 of the upper roller 105 is engaged with the engaging groove 116 of the upper roller holder 109 installed on the end of the upper rail 102 (FIG. 6a). The rolling roller 112 and guide roller 112a of the central roller 106 are engaged with the engaging grooves 119 and 120 of the central roller holder 115 installed on the end of the central rail 103 (FIG. 6b). The rolling roller 113 and guide roller 113a of the lower roller 107 are engaged with the engaging grooves 117 and 118 of the lower roller holder 110 installed on the end of the lower rail 104 (FIG. 6c).

In this instance, the upper roller 105 may include a guide roller 111 engaged with the engaging groove 116 and a rolling roller moving along an engaging groove (not shown).

The upper roller 105, the lower roller 107, and the central roller 106 are inserted and supported in the engaging grooves 116, 117, 118, 119, and 120 by the elastic force of the upper, lower, and central roller holders 109, 110, and 115 made of rubber.

Therefore, it can prevent the sliding door 108 from rocking or rattling due to the shock or vibration applied to the cab, when the equipment works, with the sliding door being fully opened.

As a result, the operator can concentrate upon his work to increase the operation efficiency and also prevent a safety accident due to the rocking or rattling of the sliding door.

Figure 7:
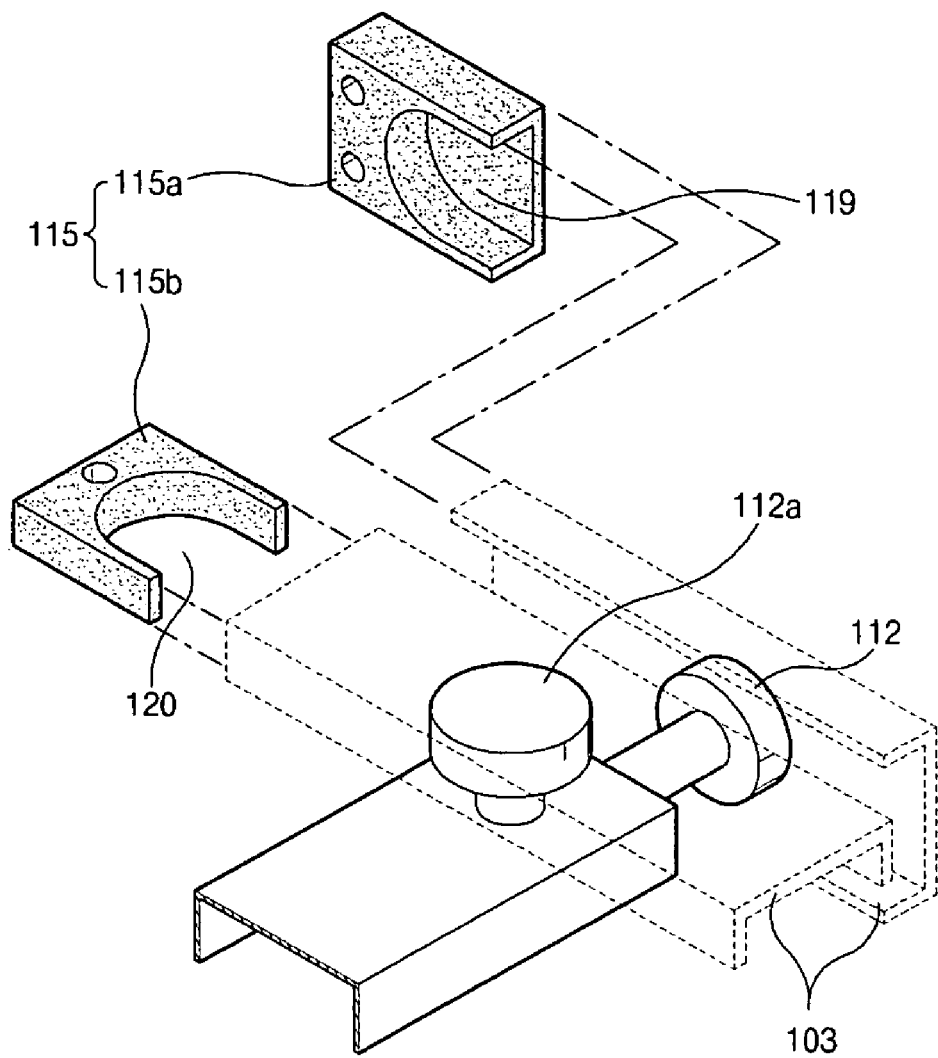
FIG. 7 is an alternative embodiment of a roller holder mounted on a cab for heavy construction equipment according to the present invention.

Referring to FIG. 7, if the central roller holder 115 is divided into a first roller holder 115a receiving the rolling roller 112 and a second roller holder 115b receiving the guide roller 112a, the rocking or rattling of the door can be absorbed by the first the roller holder 115a and the second roller holder 115b.

Although not shown in the drawings, the lower roller holder 110 may be divided into a first roller holder receiving the rolling roller 113 and a second roller holder receiving the guide roller 113a. This is applied in the same manner as the central roller holder 115 shown in FIG. 7, and thus the description thereof will be omitted herein.

Figure 8:
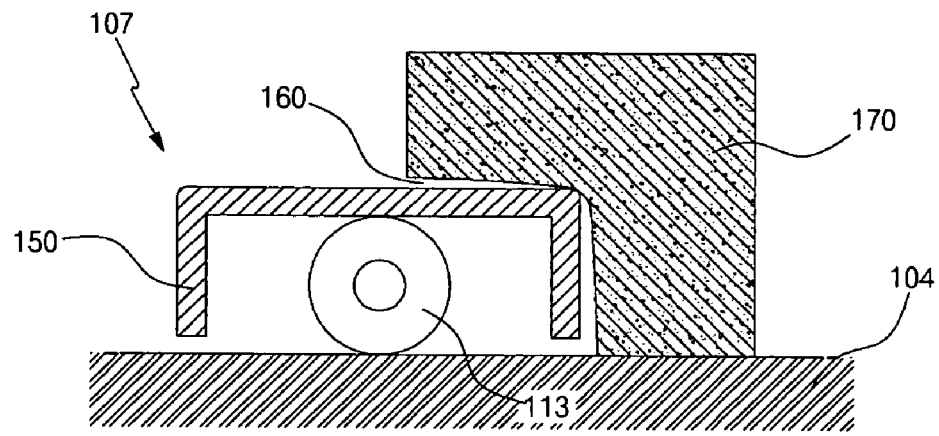
FIG. 8 is a cross-sectional view illustrating a state that the roller holder shown in FIG. 7 is accommodated in a bracket holder.

Referring to FIG. 8, the operator cab for heavy construction equipment according to the present invention further includes a lower bracket holder 170 installed on the end of the lower rail 104 and having a compressing groove 160 to receive and support the bracket 150 rotatably supporting the rolling roller 113 and guide roller 113a of the lower roller 107 when the sliding door 108 is fully opened or closed.

Accordingly, when the sliding door 108 is fully opened or closed, the lower bracket holder 170 absorbs the rocking or vibration of the door generated from the end of the lower rail 104.

Although not shown in the drawings, the operator cab may further include upper and central bracket holders installed on the end of the upper and lower rails 102 and 103, respectively, and having upper and central bracket holders to receive and support the brackets rotatably supporting the rolling roller (not shown) and guide roller 111 of the upper roller 105 and the rolling roller 112 and guide roller 112a of the lower roller 107. These are applied in the same manner as the lower bracket holder 170 shown in FIG. 8, and thus the description thereof will be omitted herein.

The process of locking the sliding door 108 will now be described, in case the sliding door 108 is in the fully opened position in the operator cab for heavy construction equipment.

Referring to FIG. 4 and FIGS. 9a to 9c, in case the sliding door 108 is slid toward the rear of the cab by the operator to open the sliding door 108, the upper roller 105, central roller 106, and lower roller 107 provided on the upper, central, and lower portions are slid along the upper rail 102, central rail 103, and lower rail 104 provided on the sidewall member 101.

In this instance, since the opened sliding door 108 is fixed to one side of the sidewall member 101 by the engagement of the locking strikers 121 and 122 in a swing radius of the operator cab far away from the doorway 104, the sliding door is not interfered with building or trees adjacent to a working site when the excavator swings on a narrow alley of a downtown area.

Figure 9A:
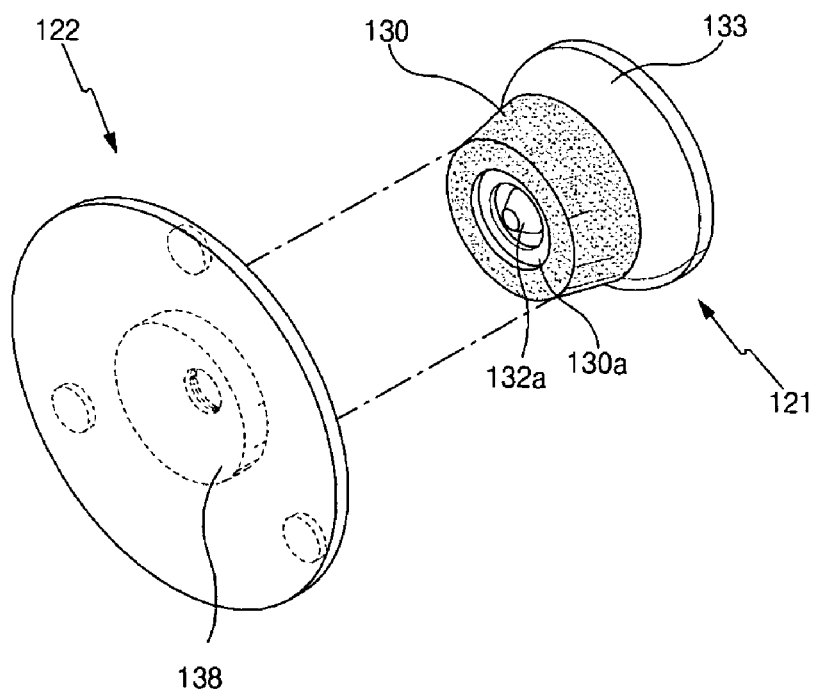
FIG. 9a is a perspective view illustrating a door locking device mounted on a cab for heavy construction equipment according to the present invention.
Figure 9B:
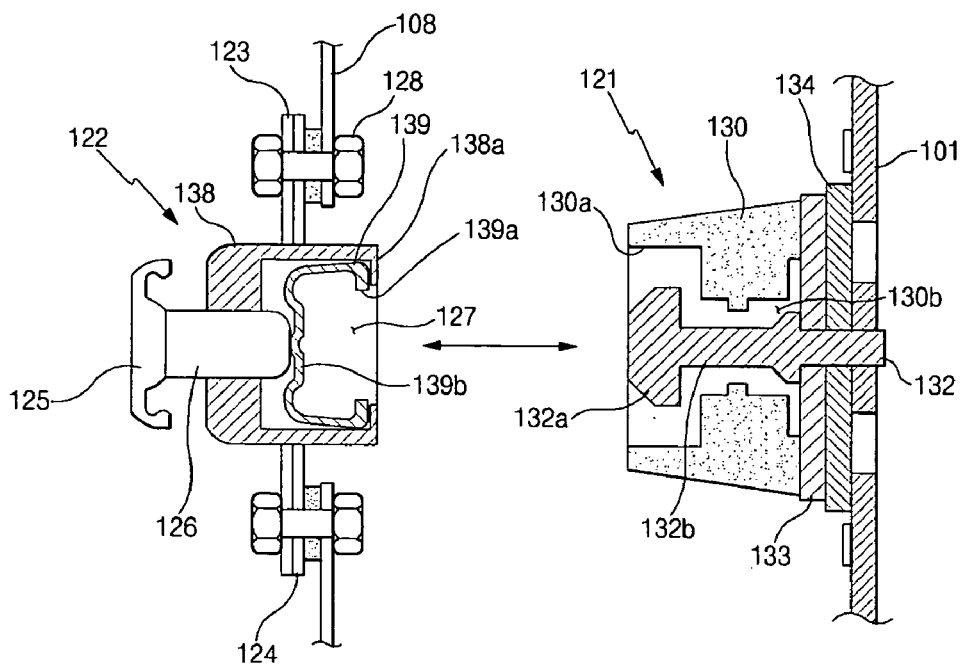
FIG. 9b is a cross-sectional view illustrating a state before the door locking device shown in FIG. 9a is locked.
Figure 9C:
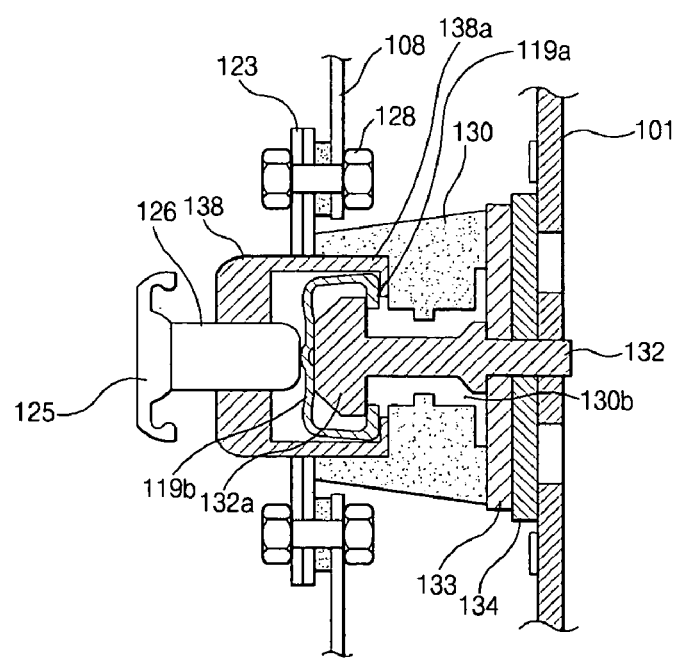
FIG. 9c is a cross-sectional view illustrating a state after the door locking device shown in FIG. 9b is locked.

Specifically, as shown in FIGS. 9a to 9c, the male locking striker 121 protruding from the sidewall member 101 of the operator cab 2 is put opposite to the female locking striker 122 having the housing 138 facing toward the doorway of the door 108.

When the door 108 is locked, the head 132a of the loader 132 provided on the male locking striker 121 passes through the opening 127 of the housing 138 of the female locking striker 122, and then collides against the bottom 139b of the fixing portion 139.

The front end 139a of the fixing portion 139 protrudes in the rearward of the head 132a of the loader 132, and then is contracted by the resilient force resulting from the collision of the head 132a against the bottom 139b. Therefore, since the head 132a of the loader 132 is fixed or supported by the housing 138, the door 108 is maintained in the fully opened state.

In this instance, the front end 138a of the housing 138 is constructed to directly receive the housing 138 when it is inserted into the rubber locking holder 130. As a result, the housing 138 absorbs the shock and noise resulting from the collision of the male locking striker 121 and the loader 132 in the case of locking the door 108.

Since the housing 138 is sealed in the recessed portion 130a, it can prevent the front end of the locking holder from being unevenly worn when the door 108 is repeatedly locked and unlocked for a long time, thereby remarkably increasing the durability and performance of absorbing the shock.

The shock of the door 108 resulting from the collision of the fixing portion 139 of the housing 138 and the head 132a of the loader 132 in the case of locking the door 108 is also transferred to the locking holder 130 of the door, so that the locking holder 130 absorbs the shock through the predetermined elastic force.

Therefore, the operator can concentrate upon his work to increase the operation efficiency and also prevent a safety accident due to the rocking or rattling of the sliding door.

As described above, the arrangement of the locking striker and locking holder may be altered in the technical scope of the present invention. That is, pairs of locking strikers may be provided on the upper or lower portion of the sidewall member of the operator cab and on the inside of the door. In this instance, the shock and vibration resulting from the locking process of the door can be absorbed by the locking holder.

With the above description, the operator cab for heavy construction equipment has the following advantages.

It suppresses the rocking or rattling of the sliding door due to the vibration applied to the operator cab in a state that the sliding door of the operator cab is opened or closed, thereby preventing the door from rocking or rattling. As a result, the working time and process is reduced thereby to lower the cost.

In addition, the locking holder is constructed in such a way that it directly accommodates a portion of the housing of the female locking striker when the locking striker collides against the loader. Therefore, the shock and noise applied to the door and the operator cab are absorbed and reduced.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An operator cab for heavy construction equipment, comprising:
   a sidewall member with a doorway;
   upper, central, and lower rails provided on upper, central, and lower portions of the sidewall member, respectively;
   a sliding door slid by upper, central, and lower rollers engaged with the upper, central, and lower rails, respectively, to open or close the doorway; and
   upper and lower roller holders installed on ends of the upper and lower rails, respectively, in a shape corresponding to the upper and lower rollers, and having an engaging groove receiving and supporting the upper and lower rollers when the sliding door is fully opened or closed.

2. An operator cab for heavy construction equipment, comprising:
   a sidewall member with a doorway;
   upper, central, and lower rails provided on upper, central, and lower portions of the sidewall member, respectively;
   a sliding door slid by upper, central, and lower rollers engaged with the upper, central, and lower rails, respectively, to open or close the doorway; and
   upper, central, and lower roller holders installed on ends of the upper, central, and lower rails, respectively, in a shape corresponding to the upper, central, and lower rollers, and having an engaging groove receiving and supporting the upper, central, and lower rollers when the sliding door is fully opened or closed.

3. The operator cab as claimed in claim 1, wherein at least one of the upper, central, and lower roller holders is an elastic member.

4. The operator cab as claimed in claim 3, wherein the elastic member is a rubber material.

5. The operator cab as claimed in claim 1, wherein each of the central and lower roller holders is divided into a first roller holder receiving a rolling roller and a second roller holder receiving a guide roller.

6. The operator cab as claimed in claim 1, further comprising upper, central, and lower bracket holders installed on the ends of the upper, central, and lower rails, respectively, and having a compressing groove receiving and supporting the bracket which rotatably supports the upper, central, and lower rollers when the sliding door is fully opened or closed.

7. An operator cab for heavy construction equipment, comprising:
 a sidewall member with a doorway;
 upper, central, and lower rails provided on upper, central, and lower portions of the sidewall member, respectively;
 a sliding door slid by upper, central, and lower rollers engaged with the upper, central, and lower rails, respectively, to open or close the doorway;
 upper and lower roller holders installed on ends of the upper and lower rails, respectively, in a shape corresponding to the upper and lower rollers, and having an engaging groove receiving and supporting the upper and lower rollers when the sliding door is fully opened or closed;
 a locking device having a pair of male and female locking strikers which are engaged to each other at one side of the sliding door when the sliding door is fully opened; and
 a locking holder formed on an external periphery of a loader corresponding to the male locking striker.

8. The operator cab as claimed in claim 7, wherein the locking device includes at least one pair of locking strikers installed on the upper or central and the lower portions of the door, respectively, when the sliding door is fully opened, in which one of the strikers is installed on the sliding door, and the other is installed on the sidewall member, thereby selectively locking or unlocking the sliding door.

9. The operator cab as claimed in claim 7, wherein the locking device includes:
 a male locking striker having a loader protruding from an outside of the sidewall member and a head of a diameter larger than that of a body;
 a female locking striker engaged with the male locking striker and having a housing installed on one side of the door and a fixing portion supporting a rear end of the head in the inside of the housing; and
 a locking holder installed on an outside of the loader of the male locking striker and having a recessed portion receiving a portion of the periphery surface of the housing when the door is locked.

10. The operator cab as claimed in claim 7, wherein at least one of the pair of the locking strikers are engaged with each other at the upper or lower and central portions of the door far away from the doorway of the cab when the door is fully opened.

11. The operator cab as claimed in claim 7, wherein the locking holder is made of a rubber material.

* * * * *